United States Patent [19]

Cantrell

[11] Patent Number: 4,555,703
[45] Date of Patent: Nov. 26, 1985

[54] ENVIRONMENTAL MAPPING SYSTEM

[75] Inventor: Ben H. Cantrell, Springfield, Va.

[73] Assignee: The United States of America as represented by the Secretary of the Navy, Washington, D.C.

[21] Appl. No.: 160,877

[22] Filed: Jun. 19, 1980

[51] Int. Cl.⁴ ................................................. G01S 7/44
[52] U.S. Cl. ............................... 343/5 SA; 343/5 VQ
[58] Field of Search ........................... 343/5 SA, 5 VQ

[56] References Cited

U.S. PATENT DOCUMENTS 3,353,177  11/1967  Wilmot ........................... 343/5 VQ
4,213,127  7/1980   Cole ................................. 343/5 VQ Primary Examiner—T. H. Tubbesing
Attorney, Agent, or Firm—Robert F. Beers; William T. Ellis; Alan P. Klein

[57] ABSTRACT

A circuit which detects environmental sources of echos received by a pulse-echo system such as a radar and classifies the sources of the echo at each range resolution cell as either short-pulse interference, rain clutter or jamming, distributed land clutter, an isolated target or thermal noise. The circuit implements on the screen of a cathode ray tube a digital map of a selected echo source type by modulating the electron beam intensity with a binary digit (0 or 1) at each increment of the sweep corresponding to a range resolution cell. The circuit utilizes a pulse-to-pulse noncoherent subtraction to remove correlated echos, leaving only uncorrelated type echos. Short-pulse interference is then detected and the uncorrelated echo component is compared to thermal noise to determine if rain clutter or noise jamming is present. The threshold for either target detection or land clutter is determined from the uncorrelated echo component, and all correlated targets and land clutter are next detected. The correlated echos are separated into distributed land clutter and isolated targets by the following procedure: the isolated targets are required to have uncorrelated echos on each side of them in range. Finally, if no detection of any of these types is made, thermal noise is declared.

17 Claims, 24 Drawing Figures

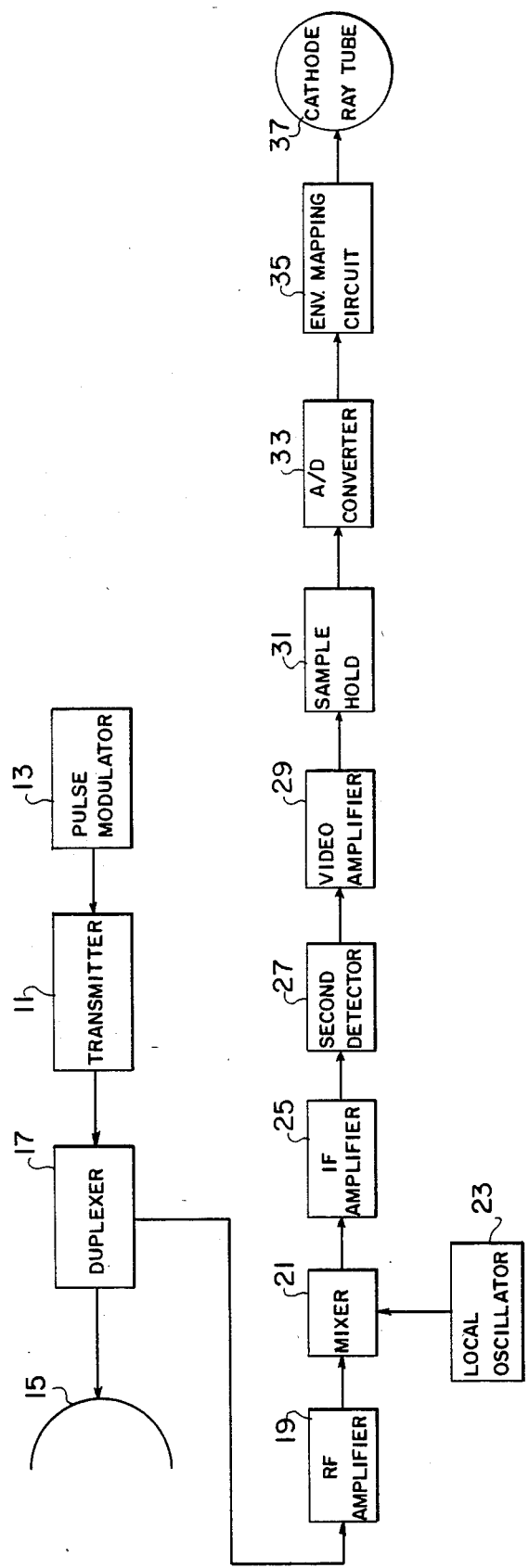

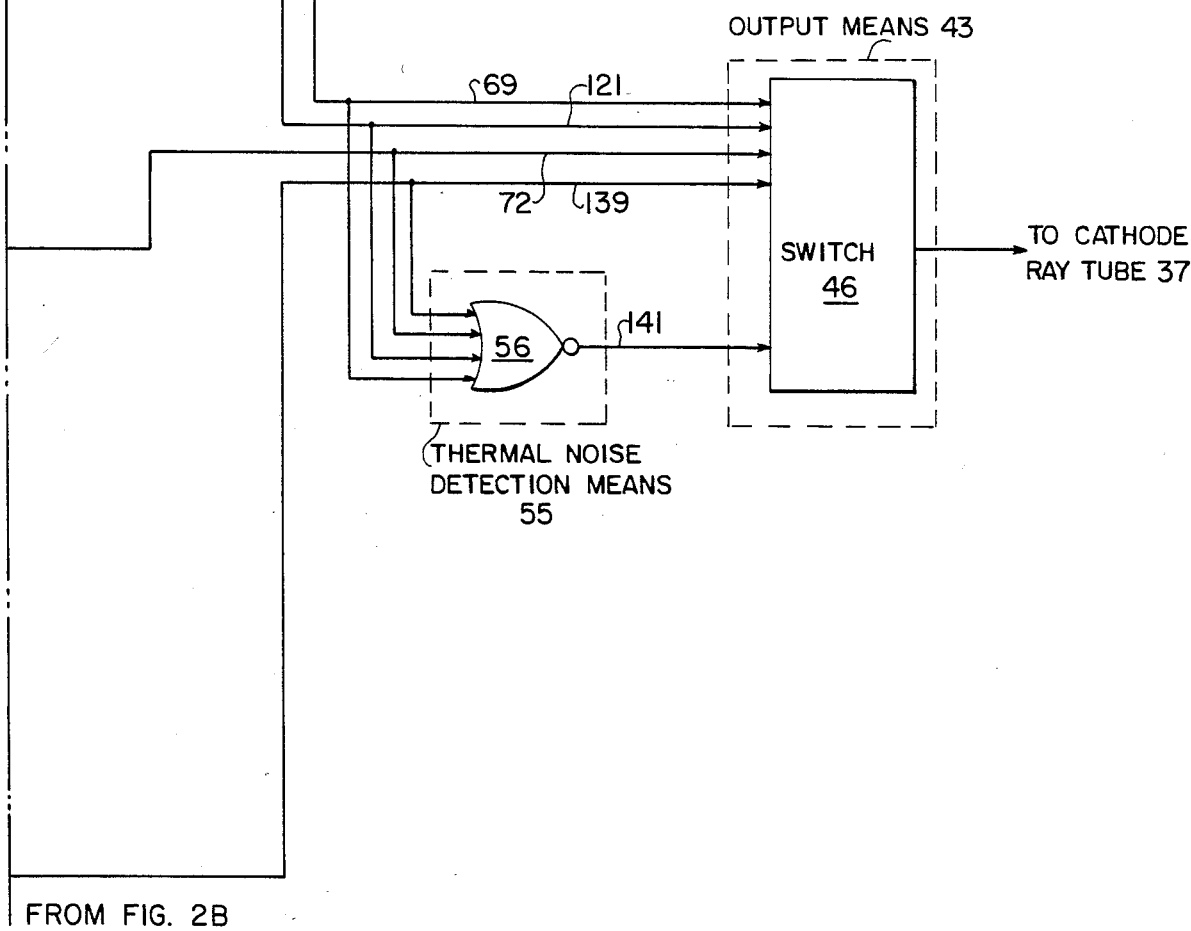

ENVIRONMENTAL MAPPING SYSTEM

BACKGROUND OF THE INVENTION

The present invention relates to a system for detecting and displaying information received from a pulse-echo (radar) system.

In conventional pulse-echo object detection systems, a pulse of energy, generally consisting of a number of cycles of sine wave carrier frequency, is radiated into a medium from a source. If there is a target object in the path of the pulse, it will cause some of the pulse energy to be reflected back toward the source, and the distance from the source to the target, i.e., target range, can be determined by measuring the pulse transit time to the target and return. A number of factors including the terrain around the energy source and target object, the weather, and spurious signals generated within or coupled into the pulse-echo return system may introduce extraneous information into the receiver output. Pulse-echo object detection systems in the past were for the most part concerned with detecting targets and not with detecting and displaying this extraneous information. Thus, the major emphasis in detection and signal processing has been to remove all extraneous signals and to provide detection mechanisms for targets. However, another useful endeavor could be to provide an instrumentality for describing the environmental conditions surrounding and underlying the detection regions. Such an environmental map could supply badly needed information for improved operation of the tracking system and, because a better picture of the prevailing situation would be available, the operation of the pulse-echo object detection system could be modified accordingly.

SUMMARY OF THE INVENTION

Accordingly, it is an object of the present invention to map the location of selected echo source types in the environment of an energy source and target object.

Another object is to detect and classify the source of the echo at each range resolution cell of the environment of an energy source and target object.

A further object is to detect and classify the source of the echo at each range resolution cell of the environment of an energy source and target object as either short pulse interference, rain clutter or jamming, distributed land clutter, an isolated target or thermal noise, and to implement on the screen of a cathode ray tube a digital map of a selected echo source type.

The objects of the present invention are achieved by an environmental mapping system. The system includes an input means for delaying the first of two successive pulse-echo returns and outputting the two returns simultaneously to a classification means which then generates a plurality of classification signals representing the expectation (0 or 1) of finding an echo from a respective one of a plurality of environmental sources in the amplitudes of the two returns versus time after transmission. An output means is provided for connecting the classification means to a display to transmit any of the plurality of classification signals to the display to provide a map of the locations of any selected echo source type.

The environmental mapping system has several advantages. It classifies the type of signals which are present in the environment of an energy source and target object in an automatic manner so that the information can be used to aid and modify automatic detection and tracking processes. Secondly, it provides a technique of obtaining target detections which are not suppressed by other targets, clutter, or interferences beyond 3 range cells away, with no sacrifice in false alarms. This represents a substantial improvement in target detectability over conventional detectors.

Additional advantages and features will become apparent as the subject invention becomes better understood by reference to the following detailed description when considered in connection with the accompanying drawings, wherein:

BRIEF DESCRIPTION OF THE DRAWINGS

FIG. 1 is a block diagram showing a pulse radar incorporating the environmental mapping circuitry according to the invention.

FIGS. 2A, 2B and 2C collectively show a schematic diagram of a preferred embodiment of the environmental mapping circuitry according to the invention.

DESCRIPTION OF THE PREFERRED EMBODIMENT

Figure 2A:
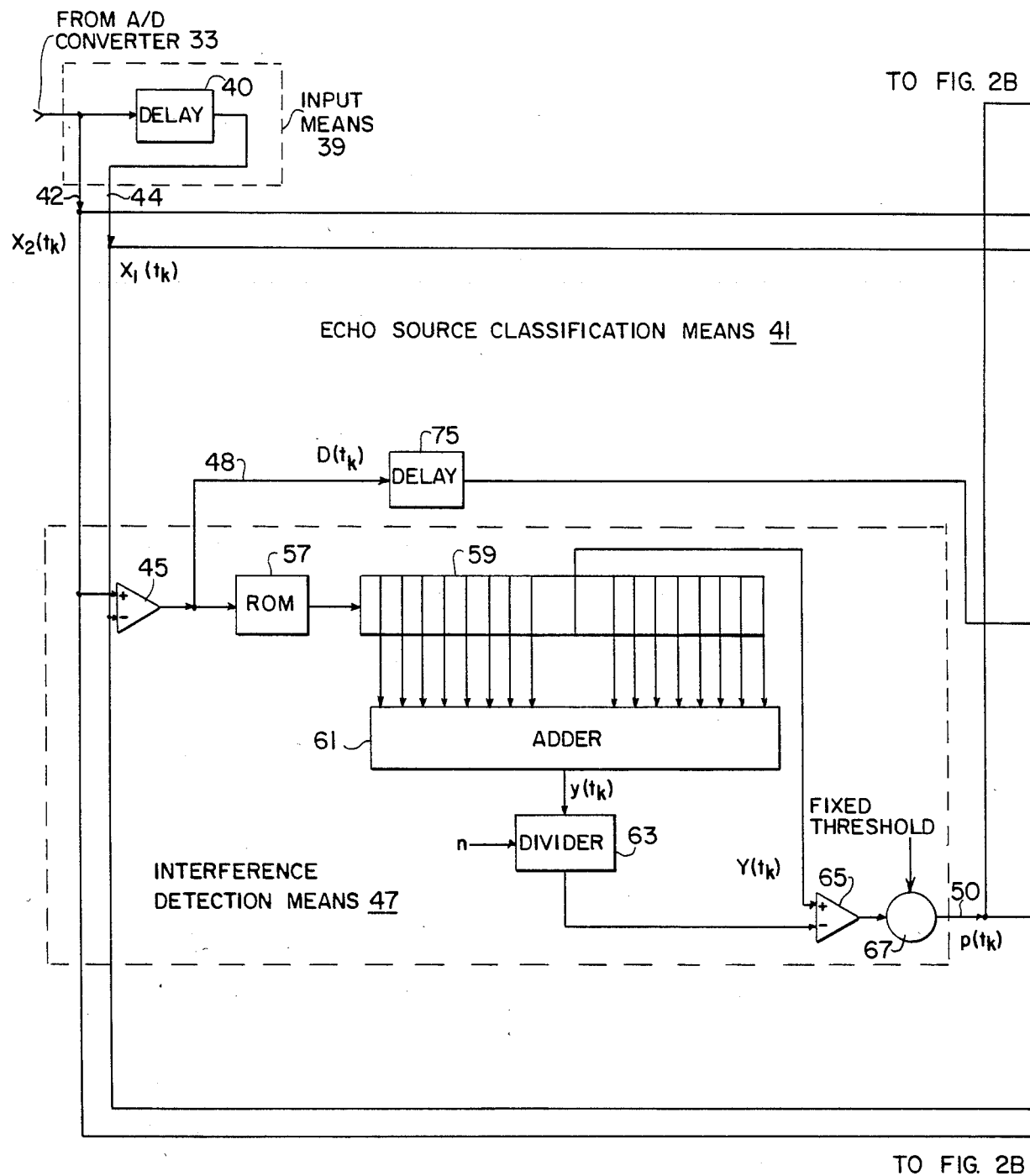

In the present example, the invention will be described with reference to a radar system although the inventive teachings are equally applicable to other pulse-echo return systems. Referring now to FIG. 1, there is illustrated in schematic block form a pulse radar incorporating the environmental mapping circuitry of the invention. Since such radars are known in the radar art, the pulse radar will be described only insofar as is necessary to set forth the cooperative relationship of the apparatus of the invention. The transmitter 11 may be an oscillator, such as a magnetron, that is pulsed (turned on and off) by the modulator 13 to generate a repetitive train of pulses spaced apart by the pulse repetition interval. The waveform generated by the transmitter 11 travels via a transmission line to an antenna 15 where it is radiated into space. The antenna is used for both transmitting and receiving. A duplexer 17 channels the radar returns to the receiver. The receiver may be of the super-heterodyne type having a first stage including a low-noise RF amplifier 19 and a mixer 21. The mixer 21 and a local oscillator 23 convert the RF signal to an intermediate frequency (IF). After maximizing the signal-to-noise ratio in an IF amplifier 25, the pulse modulation is extracted by a second detector 27 and amplified by a video amplifier 29. Following the video amplifier, the resulting video signal, $F(t)$, is sampled in a sample-and-hold circuit 31 at a rate sufficient to obtain K samples, $F(t_k)$, during one pulse repetition interval, where the voltage samples $F(t_k)$, $k = 0, 1, 2, \ldots, K$ are spaced apart by the range resolution. The term "range resolution" is used herein in its conventional sense as the minimum range interval (or echo time separation) by which targets can be separated and be separately distinguished by the radar. The effect of the sampling of the video signal F(t) is to subdivide the radial distance from the radar into K range resolution cells and to sample the amplitude of the echo at each range resolution cell. The voltage samples are next converted to a series of digital words, $X(t_k)$, by an analog-to-digital converter 33. The digital words for one pulse repetition interval, $[X(t_k)]$, represent the amplitude of one radar return versus time after transmission. The environmental mapping circuitry 35 utilizes two signals $[X_1(t_k)]$ and $[X_2(t_k)]$ to detect and classify the source of the echo at each range resolution cell as either short-pulse interference, rain clutter or jamming, distributed land clutter, an isolated target or thermal noise, and implements on the screen of cathode ray tube 37 a digital map of a selected echo source type by modulating the electron beam intensity with a binary digit (0 or 1) at each increment of the sweep corresponding to a range resolution cell. The form of the display may be the plan position indicator which maps the radar environment in polar coordinates by rotating the electron beam in angle, in response to the antenna position. Since the present invention is deemed to reside in the environmental mapping circuitry 35, further description of the other elements of the radar which are well known to those skilled in the radar art is considered superfluous.

Figure 2B:
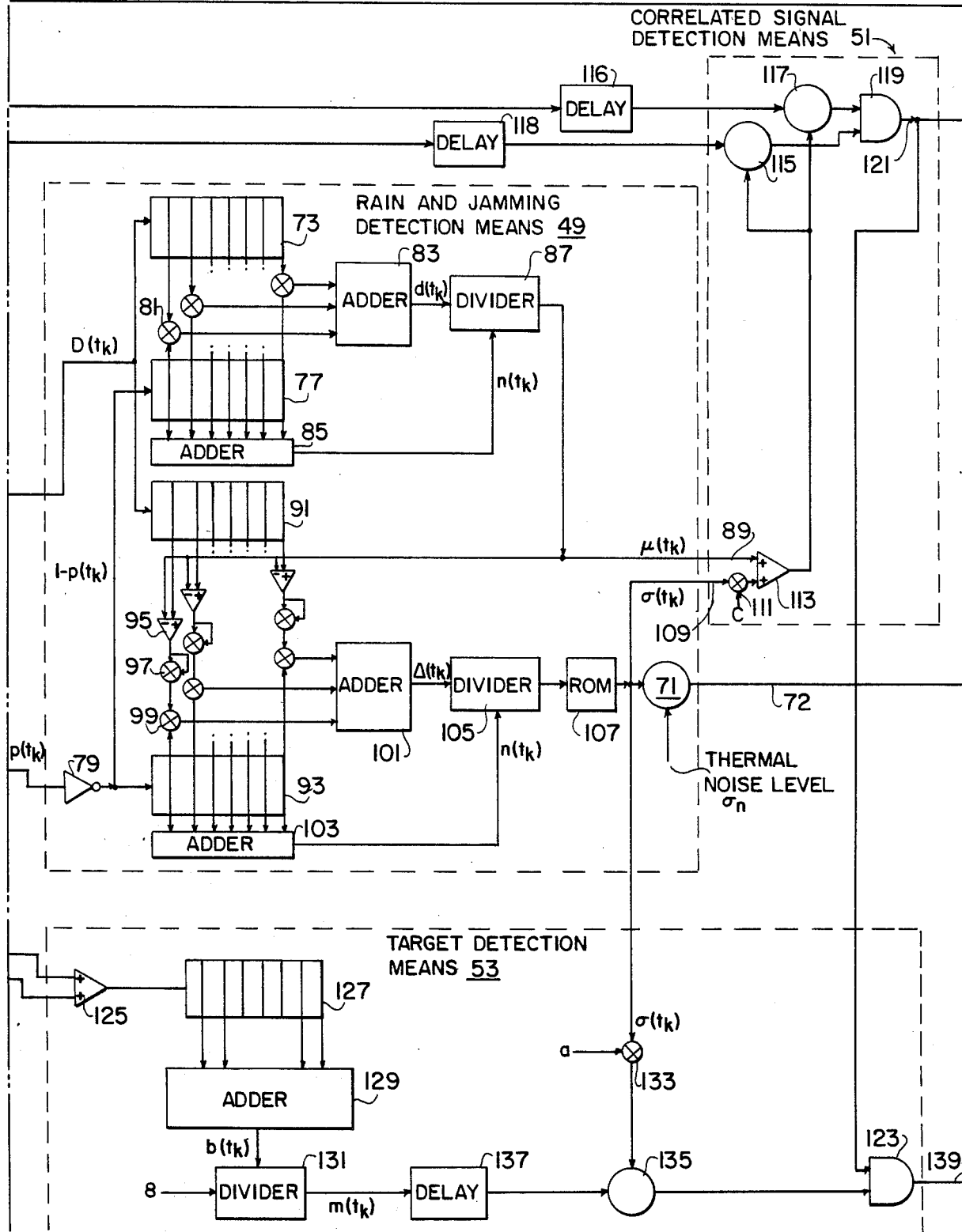

Referring now to FIGS. 2A–2C, there is schematically illustrated in more detail the environmental mapping circuitry of the present invention. The environmental mapping circuitry 35 includes an input means 39, an echo source classification means 41 connected to the input means for generating a plurality of classification signals, and an output means 43 for connecting the echo source classification means to the cathode ray tube 37 to transmit any of the plurality of classification signals for display. The input means 39 receives from the analog-to-digital converter 33 a first signal $[X_1(t_k)]$ representing the amplitude of a first radar return (1) versus time after transmission, a subsequent second signal $[X_2(t_k)]$ representing the amplitude of a second radar return (2) versus time after transmission and simultaneously outputs to the echo source classification means 41 on lines 42 and 44 the second signal and a delayed replica of the first signal. Each of the classification signals generated by the echo source classification means 41 is a binary waveform whose amplitude (logic "0" or "1") represents the expectation of finding an echo from a respective one of a plurality of environmental sources in the amplitudes of the first radar return (1) and the second radar return (2) versus time after transmission. The input means 39 may comprise, for example, a delay line 40 having input and output terminals spaced apart by one pulse repetition interval. The output means 43 (see FIG. 2C) may comprise, for example, an electric switch 46 for making, breaking or changing the connections between the echo source classification means 41 and the intensity modulation (Z-axis) input of the cathode ray tube 37.

While the echo source classification means 41 may take a variety of forms, conveniently it may take the form illustrated in FIGS. 2A–2C, of the interference detection means 47, rain and jamming detection means 49, correlated signal detection means 51, target detection means 53, and thermal noise detection means 55.

The interference detection means 47 is connected to the input means 39 to receive the second signal $[X_2(t_k)]$ and the delayed replica of the first signal $[X_1(t_k)]$. Interference detection means 47 generates a third signal $[D(t_k)]$ on line 48 representing the difference in the amplitudes of the first radar return (1) and the second radar return (2) versus time after transmission, and a fourth signal $[p(t_k)]$ on line 50 representing the expectation of finding short-pulse interference in the amplitudes of the first radar return (1) and the second radar return (2) versus time after transmission.

The rain and jamming detection means 49 is connected to the interference detection means 47 to receive the third signal $[D(t_k)]$ and the fourth signal $[p(t_k)]$. Rain and jamming detection means 49 generates a fifth signal on line 89, a sixth signal on line 109 and a seventh signal on line 72. The fifth signal $[\mu(t_k)]$ represents the mean value of the difference in amplitudes of the first radar return (1) and the second radar return (2), weighted by $[1-p(t_k)]$, the inverse of the expectation of finding short pulse interference in the amplitudes of the first (1) and second (2) radar returns, versus time after transmission. The sixth signal $[\sigma(t_k)]$ represents the standard deviation of the difference in amplitudes of the first radar return (1) and the second radar return (2), weighted by $[1-p(t_k)]$, versus time after transmission. The seventh signal represents the expectation of finding rain and jamming echos in the amplitudes of the first radar return (1) and the second radar return (2) versus time after transmission.

The correlated signal detection means 51 is connected to the input means 39 to receive the second signal $[X_2(t_k)]$ and the delayed replica of the first signal $[X_1(t_k)]$, and is connected to the rain and jamming detection means 49 to receive the fifth signal $[\mu(t_k)]$ and the sixth signal $[\sigma(t_k)]$. Correlated signal detection means 51 generates an eighth signal on line 121 representing the expectation of finding correlated target and land clutter echos in the amplitudes of the first radar return (1) and the second radar return (2) versus time after transmission.

The target detection means 53 is connected to the input means 39 to receive the second signal $[X_2(t_k)]$ and the delayed replica of the first signal $[X_1(t_k)]$; it is connected to the rain and jamming means 49 to receive the sixth signal $[\sigma(t_k)]$; and it is connected to the correlated signal detection means 51 to receive the eighth signal. Target detection means 53 generates a ninth signal on line 139 representing the expectation of finding a correlated target echo in the amplitudes of the first radar return (1) and the second radar return (2) versus time after transmission.

The thermal noise detection means 55 is connected to the interference detection means 47 to receive the fourth signal $[p(t_k)]$; it is connected to the rain and jamming detection means 49 to receive the seventh signal; it is connected to the correlated signal detection means 51 to receive the eighth signal; and it is connected to the target detection means 53 to receive the ninth signal. Thermal noise detection means 55 generates a tenth signal on line 141 representing the expectation of finding thermal noise in the amplitudes of the first radar return (1) and the second-radar return (2) versus time after transmission.

Figure 3A:
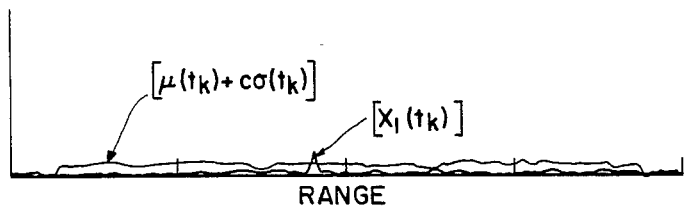
FIGS. 3A–3D show exemplary recordings of signals of interest when short pulse interference is present.
Figure 3B:
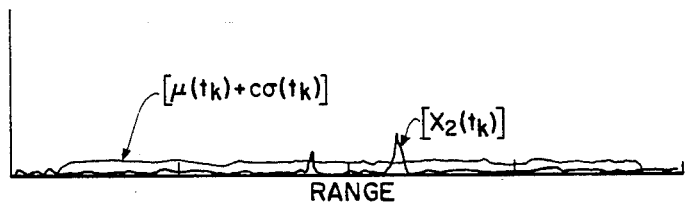
Figure 3C:
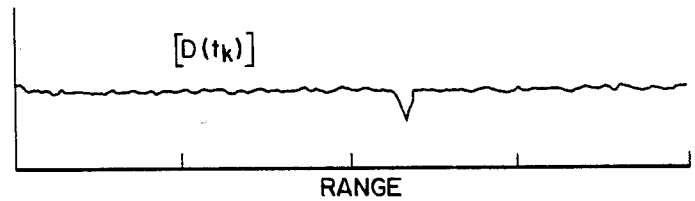
Figure 3D:
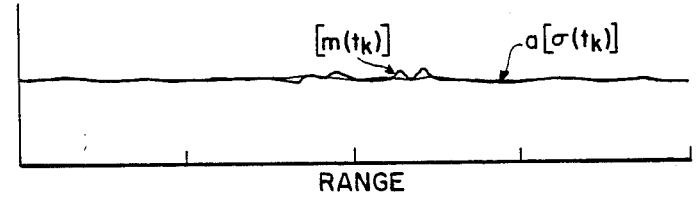
Figure 4A:
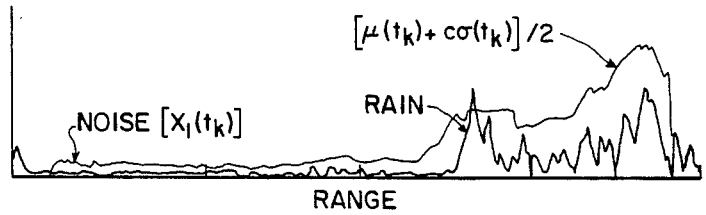
FIGS. 4A–4D show exemplary recordings of signals of interest when rain clutter is present.
Figure 4B:
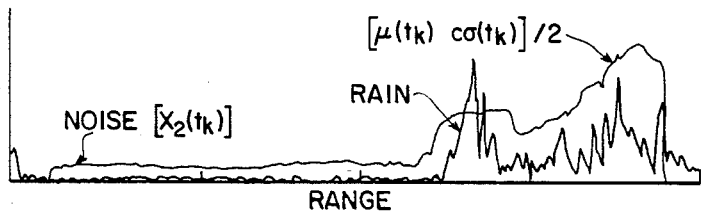
Figure 4C:
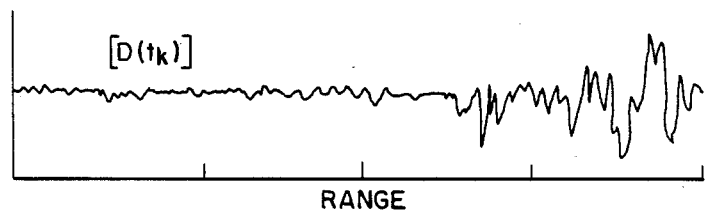
Figure 4D:
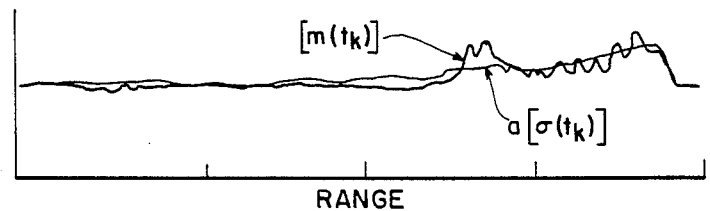
Figure 5A:
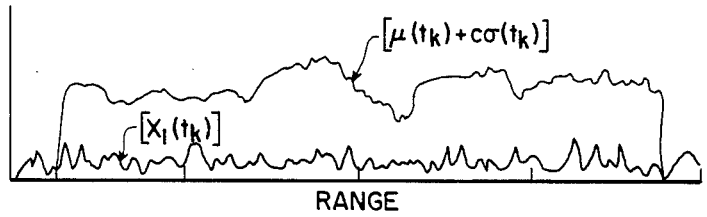
FIGS. 5A–5D show exemplary recordings of signals of interest when jamming is present.
Figure 5B:
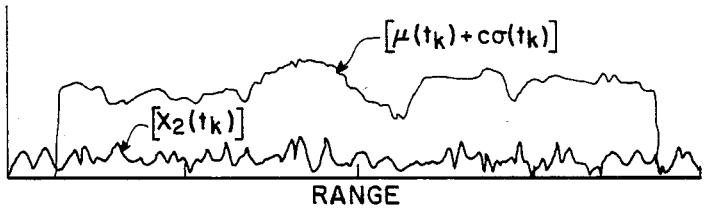
Figure 5C:
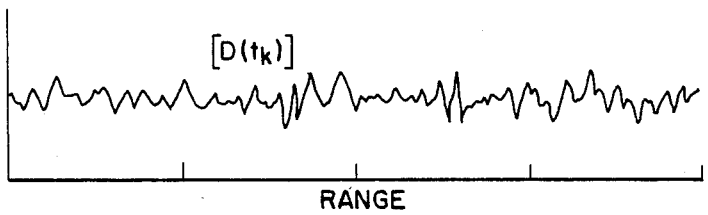
Figure 5D:
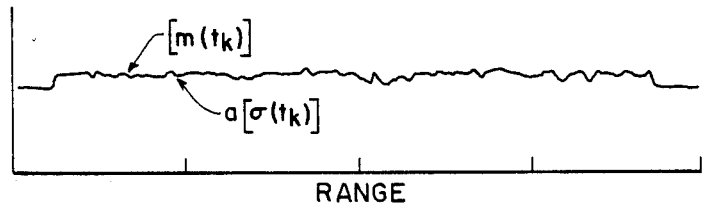
Figure 6A:
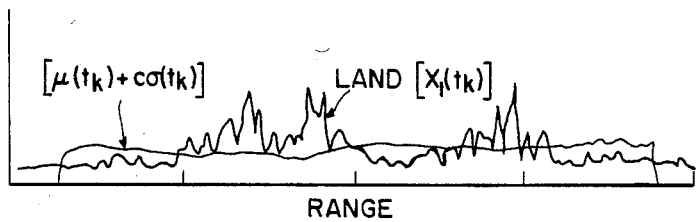
FIGS. 6A–6D show exemplary recordings of signals of interest when distributed land clutter is present.
Figure 6B:
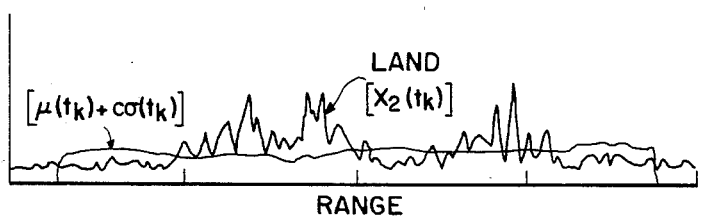
Figure 6C:
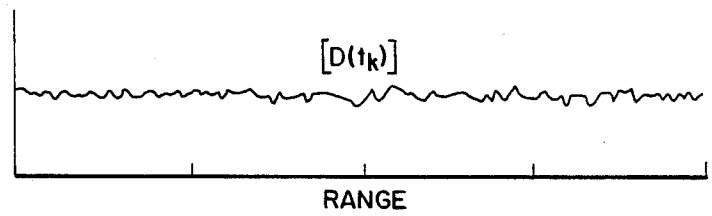
Figure 6D:
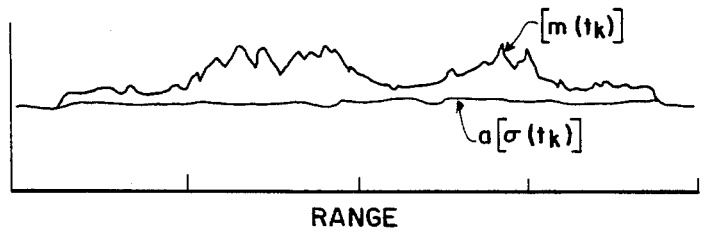
Figure 7A:
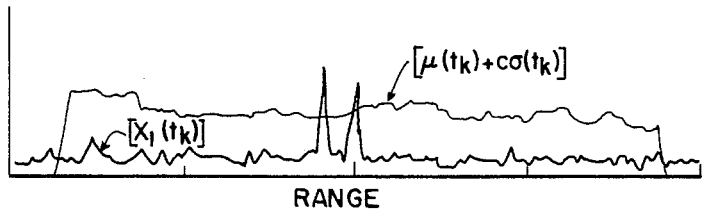
FIGS. 7A–7D show exemplary recordings of signals of interest when two isolated targets are present.
Figure 7B:
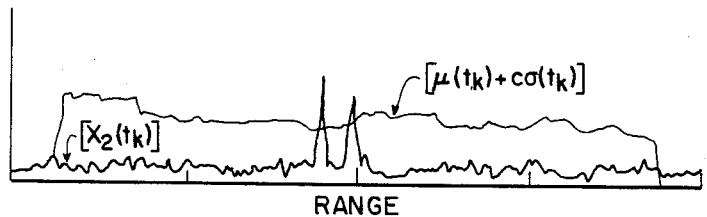
Figure 7C:
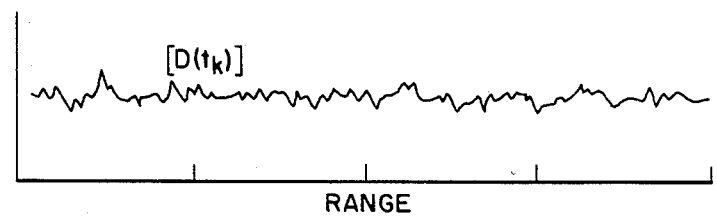
Figure 7D:
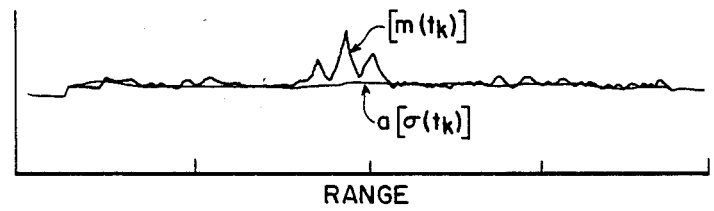

While the interference detection means 47 may take a variety of forms, conveniently it may take the form illustrated in FIG. 2A of a subtractor 45, connected to the input and output terminals of the delay line 40 to receive the second signal $[X_2(t_k)]$ and the delayed replica of the first signal $[X_1(t_k)]$, for generating a third signal $[D(t_k)]$ equal to their difference and containing only uncorrelated echos since correlated echos cancel; means connected to the subtractor 45 for generating an eleventh signal representing the geometric mean of the difference in the amplitudes of the first radar return (1) and the second radar return (2) in a time range about the time after transmission, versus the time after transmission; and means connected to the eleventh signal generating means for comparing the third signal to the eleventh signal to generate the fourth signal [p(t$_k$)]. Exemplary recordings of [X$_1$(t$_k$)], [X$_2$(t$_k$)] and [D(t$_k$)] are shown in FIGS. 3A, 3B, and 3C respectively for the case when short pulse interference is present, in FIGS. 4A, 4B and 4C respectively for the case when rain clutter is present, in FIGS. 5A, 5B and 5C respectively for the case when jamming is present, in FIGS. 6A, 6B and 6C respectively for the case when distributed land clutter is present, and in FIGS. 7A, 7B and 7C respectively for the case when isolated targets are present.

The eleventh signal generating means may comprise, for example, a read-only memory 57 connected to the subtractor 45 and preprogrammed to perform the table lookup function $[Y(t_k)] = [10 \log (1 + |D(t_k)|)]$; a delay line 59 connected to the read-only memory 57 and having 2n+3 taps spaced apart by the range resolution, where n is an integer much less than K; and adder 61 connected to the taps on either side of the 3 central taps of the delay line 59 for performing the sum $$\left[ \sum_{j=2}^{n+1} Y(t_{k+j}) + \sum_{j=2}^{n+1} Y(t_{k-j}) \right] = [y(t_k)]$$

and a divider 63 connected to the adder 61 for performing the division (1/n)[y(t$_k$)]. The comparing means may comprise, for example, a subtractor 65 connected to the center tap of the delay line 59 and to the divider 63 for performing the subtraction $[Y(t_k) - (1/n)y(t_k)]$; and a comparator 67 connected to the subtractor 65 for comparing the output of the subtractor to a fixed threshold to generate the fourth signal [p(t$_k$)]. A logical "1" value of p(t$_k$) for any k indicates at range resolution cell k the presence of uncorrelated echos whose amplitude difference is above the geometric mean of the amplitude difference of the echos at adjacent range resolution cells, i.e., short pulse interference in the digitized amplitude sample X$_1$(t$_k$) or X$_2$(t$_k$); a logical "0" value of p(t$_k$) indicates the absence of short pulse interference in the digitized amplitude sample X$_1$(t$_k$) or X$_2$(t$_k$). The fixed threshold is set by design and may be, for example, such that a logical "1" value of p(t$_k$) is obtained for 1 out of $10^6$ samples F(t$_k$) when only thermal noise is present at the output of video amplifier 29.

While the rain and jamming detection means 49 may take a variety of forms, conveniently it may take the form illustrated in FIG. 2B of means connected to the interference detection means 47 for generating the fifth signal [μ(t$_k$)]; means connected to the interference detection means and the fifth signal generating means for generating the sixth signal [σ(t$_k$)]; and a comparator 71 connected to the sixth signal generating means for comparing the output of the sixth signal generating means to a fixed threshold to generate the seventh signal on output line 72.

The fifth signal generating means may comprise, for example, a delay line 73 connected to the subtractor 45 (through another delay line 75 to synchronize the received signals) and having 2n+3 taps spaced apart by the range resolution; a delay line 77 connected to output line 50 of the interference detection means 47 through an inverter 79 and also having 2n+3 taps spaced apart by the range resolution; a plurality of multipliers 81 respectively connected to one of the taps of the delay line 73 and to one of the taps of the delay line 77; an adder 83 connected to the plurality of multipliers 81 for performing the sum $$\left[ D(t_k)(1 - p(t_k)) + \sum_{j=1}^{n+1} D(t_{k+j})(1 - p(t_{k+j})) + \sum_{j=1}^{n+1} D(t_{k-j})(1 - p(t_{k-j})) \right] = [d(t_k)];$$

an adder 85 connected to the delay line 77 for performing the sum $$\left[ (1 - p(t_k)) + \sum_{j=1}^{n+1} (1 - p(t_{k+j})) + \sum_{j=1}^{n+1} (1 - p(t_{k-j})) \right] = [n(t_k)];$$

and a divider 87 connected to the adder 83 and to the adder 85 for performing the division $[d(t_k)/n(t_k)]$ to generate the fifth signal [μ(t$_k$)] on output line 89. [μ(t$_k$)] represents the mean value of the difference in amplitudes of the first and second radar returns versus time after transmission excluding range resolution cells in which short pulse interference has been detected.

The sixth signal generating means may comprise, for example, a delay line 91 connected to the subtractor 45 (through the delay line 75 to synchronize the received signals) and having 2n+3 taps spaced apart by the range resolution; a delay line 93 connected to the output line 50 of the interference detection means 47 through the inverter 79 and also having 2n+3 taps spaced apart by the range resolution; a plurality of subtractors 95 respectively connected to one of the taps of the delay line 91 and to output line 89 of the fifth signal generating means; a plurality of multipliers 97 respectively having a pair of inputs connected together to one of the plurality of subtractors 95; a plurality of multipliers 99 respectively connected to one of the plurality of multipliers 97 and to one of the taps of the delay line 93; an adder 101 connected to the plurality of multipliers 99 for performing the sum $$\left[ (D(t_k) - \mu(t_k))^2(1 - p(t_k)) + \sum_{j=1}^{n+1} (D(t_{k+j}) - \mu(t_k))^2(1 - p(t_{k+j})) + \sum_{j=1}^{n+1} (D(t_{k-j}) - \mu(t_k))^2(1 - p(t_{k-j})) \right] = [\Delta(t_k)];$$

an adder 103 connected to the delay line 93 for performing the sum [n(t$_k$)]; a divider 105 connected to the adder 101 and to the adder 103 for performing the division $[\Delta(t_k)/n(t_k)]$; and a read-only memory 107 connected to the divider 105 and preprogrammed to perform the table lookup function $[\sigma(t_k)] = [(\Delta(t_k)/n(t_k))^{\frac{1}{2}}]$ to generate the sixth signal [σ(t$_k$)] on output line 109. [σ(t$_k$)] represents the standard deviation of the difference in amplitudes of the first and second radar returns versus time after transmission excluding range resolution cells in which short pulse interference has been detected. Comparator 71 is connected to the read-only memory 107 for comparing the output [σ(t$_k$)] to the standard deviation $\sigma_n$ of the thermal noise level (a known function measured prior to equipment operation) to generate the seventh signal on output line 72. A value of $\sigma(t_k)$ greater than $\sigma_n$ indicates the presence in the (2n+2) range resolution cells about k (excluding those in which short pulse interference has been detected) of uncorrelated echos having an amplitude difference whose standard deviation is greater than that for thermal noise, i.e., the presence of rain or jamming echos in the digitized amplitude sample $X_1(t_k)$ or $X_2(t_k)$, and causes comparator 71 to output a logical "1". Any other value of $\sigma(t_k)$ indicates the absence of rain or jamming echos in the digitized amplitude samples $X_1(t_k)$ or $X_2(t_k)$ and causes comparator 71 to output a logical "0".

While the correlated signal detection means 51 may take a variety of forms, conveniently it may take the form illustrated in FIG. 2B of means connected to the rain and jamming detection means 49 for generating a signal $[\mu(t_k)+C\sigma(t_k)]$, where the coefficient C is a number typically in the range 3 to 5; and means connected to the input means 39 for comparing the second signal $[X_2(t_k)]$ and the delayed replica of the first signal $[X_1(t_k)]$ respectively to the signal $[\mu(t_k)+C\sigma(t_k)]$ to generate the eighth signal. The signal $[\mu(t_k)+C\sigma(t_k)]$ is plotted in FIGS. 3A, 3B, 4A, 4B, 5A, 5B, 6A, 6B, 7A, and 7B for the exemplary recording of $[X_1(t_k)]$ and $[X_2(t_k)]$. The $[\mu(t_k)+C\sigma(t_k)]$ signal generating means may comprise, for example, a multiplier 111 connected to the output line 109 of the rain and jamming detection means 49 for performing the multiplication $C[\sigma(t_k)]$; and an adder 113 connected to the output line 89 of the rain and jamming detection means 49 and to the multiplier 111 for performing the sum $[\mu(t_k)+C\sigma(t_k)]$. The comparing means may comprise, for example, a pair of comparators 115 and 117 respectively connected (through delay lines 116 and 118 to synchronize signals) to the input and output terminals of the delay line 40; and a coincidence gate 119 connected to the comparators 115 and 117 to generate the eighth signal on output line 121. Values of $X_1(t_k)$ and $X_2(t_k)$ greater than $\mu(t_k)+C\sigma(t_k)$ indicate the presence of correlated echos at range resolution cell k whose amplitudes are several standard deviations above the mean of the amplitude difference of the uncorrelated echos in the (2n+2) range resolution cells about k (excluding those in which short pulse interference has been detected), i.e., the presence of correlated echos (either distributed land clutter or isolated targets) in the digitized amplitude samples $X_1(t_k)$ and $X_2(t_k)$, and cause gate 119 to output a logical "1". Any other values indicate the absence of correlated signals in the digitized amplitude samples $X_1(t_k)$ or $X_2(t_k)$, and cause gate 119 to output a logical "0".

While the target detection means 53 may take a variety of forms, conveniently it may take the form illustrated in FIG. 2B of means connected to the input means 39 for generating a signal $[m(t_k)]$ representing the arithmetic mean of the amplitudes of the first radar return (1) and the second radar return (2), in a time range about the time after transmission, versus the time after transmission; means connected to the rain and jamming means 49 for comparing a function of the sixth signal $\alpha[\sigma(t_k)]$ to the signal $[m(t_k)]$ to generate a signal representing the expectation of finding uncorrelated echos, in a time range about the time after transmission, versus the time after transmission; and a coincidence gate 123 connected to the comparing means and to output line 121 of the correlated signal detection means 51 to generate the ninth signal. The signal $[m(t_k)]$ and $\alpha[\sigma(t_k)]$ are plotted in FIGS. 3D, 4D, 5D, 6D and 7D for the exemplary recordings of $[X_1(t_k)]$ and $[X_2(t_k)]$. The $[m(t_k)]$ signal generating means may comprise, for example, an adder 125 connected to the input and output terminals of the delay line 40 of input means 39 for performing the sum $[X_1(t_k)+X_2(t_k)]\equiv[B(t_k)]$; a delay line 127 connected to the adder 125 and having 7 taps spaced apart by the range resolution; an adder 129 connected to the taps on either side of the 3 central taps of the delay line 127 for performing the sum $$\left[\sum_{j=3}^{4} B(t_{k+j}) + \sum_{j=3}^{4} B(t_{k-j})\right] \equiv [b(t_k)];$$

and a divider 131 connected to the adder 129 for performing the division $\frac{1}{8}[b(t_k)]\equiv[m(t_k)]$. The comparing means may comprise, for example, a multiplier 133 connected to the output line 109 of the rain and jamming means 49 for performing the multiplication $a[\sigma(t_k)]$, where $$a = \left(\frac{\sqrt{\pi/2}}{.926}\right),$$

to generate an estimate of the mean of the uncorrelated echo level excluding short pulse interference; and a comparator 135 connected to the divider 131 (through a delay line 137 to synchronize the received signals). A value of $m(t_k)=a\sigma(t_k)$ indicates that the echos at the 4 range resolution cells k+3, k+4, k−3, k−4 about k have a mean amplitude equal to that estimated for uncorrelated echos excluding short pulse interference, and causes the comparator 135 to output a logical "1"; any other value causes the comparator 135 to output a logical "0". Coincidence gate 123 is connected to the comparator 135 to generate the ninth signal on line 139. A value of $m(t_k)$ equal to a $\sigma(t_k)$ (uncorrelated echos in the 4 nearby range resolution cells) and values of $X_1(t_k)$ and $X_2(t_k)$ greater than $\mu(t_k)+C\sigma(t_k)$ (a correlated echo at range resolution cell k) indicates the presence of an isolated target echo in the digitized amplitude samples $X_1(t_k)$ and $X_2(t_k)$ and causes gate 123 to output a logical "1"; any other value indicates the absence of an isolated target echo in the digitized amplitude samples $X_1(t_k)$ and $X_2(t_k)$ and causes gate 123 to output a logical "0".

While the thermal noise detection means 55 may take a variety of forms, conveniently it may take the form illustrated in FIG. 2C of a NOR gate 56 having a plurality of inputs respectively connected to the interference detection means 47, the rain and jamming detection means 49, the correlated signal detection means 51, and the target detection means 53. A logical "0" on each of the output lines 69, 72, 121 and 139 indicates that only thermal noise is present in the digitized amplitude samples $X_1(t_k)$ and $X_2(t_k)$ and causes gate 56 to output a logical "1" on line 141; otherwise the output of gate 56 remains at logical "0".

The outputs on lines 69, 72, 121, 139 and 141 can be selectively connected to the intensity modulation input of the cathode ray tube 37 by switch 46 to implement a digital map of any of the signal types. The output of the selected detection means modulates the electron beam intensity with a binary digit (0 or 1) at each increment of the sweep corresponding to a range resolution cell k according to whether or not the selected echo source type is present at the range resolution cell. The result is a radar map of the locations of the selected echo source type.

While the invention has been described with reference to a radar system it is clear that the present teachings are applicable to other pulse-echo return systems such as sonar.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An environmental mapping system comprising:
   input means for receiving a first signal representing the amplitude of a first pulse-echo return versus time after transmission, for subsequently receiving a second signal representing the amplitude of a second pulse-echo return versus time after transmission and for simultaneously outputting the second signal and a delayed replica of the first signal;
   echo source classification means, connected to the input means to receive the second signal and the delayed replica of the first signal, for generating a plurality of classification signals, each classification signal representing the expectation of finding an echo from a respective one of a plurality of environmental sources in the amplitudes of the first and second pulse-echo returns versus time after transmission; and
   output means for connecting the echo source classification means to a display means to transmit to the display means any of the plurality of classification signals.

2. The system recited in claim 1 wherein the input means includes:
   a delay line.

3. The system recited in claim 1 wherein the echo source classification means includes:
   interference detection means connected to the input means to receive the second signal and the delayed replica of the first signal for generating a third signal representing the difference in the amplitudes of the first and second pulse-echo returns versus time after transmission, and a fourth signal representing the expectation of finding short pulse interference in the amplitudes of the first and second pulse echo returns versus time after transmission;
   rain and jamming detection means connected to the interference detection means to receive the third signal and the fourth signal for generating a fifth signal representing the mean value of the difference in amplitudes of the first and second pulse-echo returns weighted by the inverse of the expectation of finding short pulse interference in the amplitudes of the first and second pulse-echo returns versus time after transmission, a sixth signal representing the standard deviation of the difference in amplitudes of the first and second pulse-echo returns weighted by the inverse of the expectation of finding short pulse interference in the amplitudes of the first and second pulse-echo returns versus time after transmission, and a seventh signal representing the expectation of finding rain and jamming echos in the amplitudes of the first and second pulse-echo returns versus time after transmission;
   correlated signal detection means connected to the input means to receive the second signal and the delayed replica of the first signal and connected to the rain and jamming detection means to receive the fifth and sixth signals for generating an eighth signal representing the expectation of finding correlated target and land clutter echos in the amplitudes of the first and second pulse-echo returns versus time after transmission;
   target detection means connected to the input means to receive the second signal and the delayed replica of the first signal, connected to the rain and jamming means to receive the sixth signal, and connected to the correlated signal detection means to receive the eighth signal for generating a ninth signal representing the expectation of finding a correlated target echo in the amplitude of the first and second pulse-echo returns versus time after transmission; and
   thermal noise detection means connected to the interference detection means to receive the fourth signal, connected to the rain and jamming means to receive the seventh signal, connected to the correlated signal detection means to receive the eighth signal, and connected to the target detection means to receive the ninth signal for generating a tenth signal representing the expectation of finding thermal noise in the amplitudes of the first and second pulse-echo returns versus time after transmission.

4. The system recited in claim 3 wherein the interference detection means includes:
   a first subtractor connected to the input means to receive the second signal and the delayed replica of the first signal for generating the third signal;
   means connected to the first subtractor for generating an eleventh signal representing the geometric mean of the difference in the amplitudes of the first and second pulse-echo returns in a time range about the time after transmission versus the time after transmission; and
   means connected to the eleventh signal generating means for comparing the third signal to the eleventh signal to generate the fourth signal.

5. The system recited in claim 4 wherein the eleventh signal generating means includes:
   a read-only memory connected to the first subtractor;
   a delay line connected to the read-only memory and having 2n+3, taps, where n is an integer;
   an adder connected to the taps on either side of the 3 central taps of the delay line; and
   a divider connected to the adder.

6. The system recited in claim 5 wherein the comparing means includes:
   a second subtractor connected to the center tap of the delay line and to the divider; and
   a comparator connected to the second subtractor for comparing the output of the subtractor to a fixed threshold to generate the fourth signal.

7. The system recited in claim 3 wherein the rain and jamming detection means includes:
   means connected to the interference detection means for generating the fifth signal;
   means connected to the interference detection means and the fifth signal generating means for generating the sixth signal; and a comparator connected to the sixth signal generating means for comparing the output of the sixth signal generating means to a fixed threshold to generate the seventh signal.

8. The system recited in claim 7 wherein the fifth signal generating means includes:
   a first delay line connected to the interference detection means and having a plurality of taps;
   a second delay line connected to the interference detection means and having a plurality of taps;
   a plurality of multipliers respectively connected to one of the taps of the first delay line and to one of the taps of the second delay line;
   a first adder connected to the plurality of multipliers;
   a second adder connected to the plurality of taps of the second delay line; and
   a divider connected to the first and second adders.

9. The system recited in claim 7 wherein the sixth signal generating means includes:
   a first delay line connected to the interference detection means and having a plurality of taps;
   a second delay line connected to the interference detection means and having a plurality of taps;
   a plurality of subtractors respectively connected to one of the taps of the first delay line and to the fifth signal generating means;
   a first plurality of multipliers respectively having a pair of inputs connected together to one of the plurality of subtractors;
   a second plurality of multipliers respectively connected to one of the first plurality of multipliers and to one of the taps of the second delay line;
   a first adder connected to the second plurality of multipliers;
   a second adder connected to the plurality of taps of the second delay line;
   a divider connected to the first and second adders; and
   a read-only memory connected to the divider.

10. The system recited in claim 3 wherein the correlated signal detection means includes:
    means connected to the rain and jamming means for generating an eleventh signal representing the sum of the mean value of the difference in amplitudes of the first and second pulse-echo returns weighted by the inverse of the expectation of finding short pulse interference in the amplitudes of the first and second pulse-echo returns versus time after transmission plus a multiple of the standard deviation of the difference in amplitudes of the first and second pulse-echo returns weighted by the inverse of the expectation of finding short pulse interference in the amplitudes of the first and second pulse-echo returns versus time after transmission; and
    means connected to the input means for comparing the second signal and the delayed replica of the first signal respectively to the eleventh signal to generate the eighth signal.

11. The system recited in claim 10 wherein the eleventh signal generating means includes:
    a multiplier connected to the rain and jamming means; and
    an adder connected to the rain and jamming means and to the multiplier.

12. The system recited in claim 10 wherein the comparing means includes:
    a pair of comparators connected to the input means; and
    a coincidence gate connected to the comparators.

13. The system recited in claim 3 wherein the target detection means includes:
    means connected to the input means for generating an eleventh signal representing the arithmetic mean of the amplitudes of the first and second pulse-echo returns in a time range about the time after transmission versus the time after transmission;
    means connected to the rain and jamming means and the eleventh signal generating means for comparing a function of the sixth signal to the eleventh signal to generate a twelfth signal representing the expectation of finding uncorrelated echos in a time range about the time after transmission versus the time after transmission; and
    a coincidence gate connected to the comparing means and the correlated signal detection means to generate the ninth signal.

14. The system recited in claim 13 wherein the eleventh signal generating means includes:
    a first adder connected to the input means;
    a delay line connected to the adder and having $2n+3$ taps, where n is an integer;
    a second adder connected to the taps on either side of the 3 central taps of the delay line; and
    a divider connected to the second adder.

15. The system recited in claim 14 wherein the comparing means includes:
    a multiplier connected to the rain and jamming means; and
    a comparator connected to the multiplier and the eleventh signal generating means.

16. The system recited in claim 3 wherein the thermal noise detection means includes:
    a NOR logic gate having a plurality of inputs respectively connected to the interference detection means, the rain and jamming detection means, the correlated signal detection means, and the target detection means.

17. The system recited in claim 1 wherein the output means includes:
    a switch.

* * * * *